United States Patent

Kamiguchi et al.

[11] Patent Number: 6,051,170
[45] Date of Patent: *Apr. 18, 2000

[54] METHOD OF COLLECTING MOLDING DATA AND OBTAINING MOLDING CONDITION FOR INJECTION MOLDING MACHINE

[75] Inventors: Masao Kamiguchi, Minamitsuru-gun; Kenji Araki; Osamu Saito, both of Oshino-mura, all of Japan

[73] Assignee: FANUC Ltd., Yamanashi, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/930,978

[22] PCT Filed: Feb. 17, 1997

[86] PCT No.: PCT/JP97/00415

§ 371 Date: Oct. 15, 1997

§ 102(e) Date: Oct. 15, 1997

[87] PCT Pub. No.: WO97/29898

PCT Pub. Date: Aug. 21, 1997

[30] Foreign Application Priority Data

Feb. 15, 1996 [JP] Japan .................... 8-050745

[51] Int. Cl.$^7$ .................................. B29C 45/76
[52] U.S. Cl. ............... 264/40.1; 264/328.1; 364/475.05
[58] Field of Search ................ 264/40.1, 328.1; 425/135, 162, 168, 169; 364/475.02, 475.05, 475.06, 468.15

[56] References Cited

U.S. PATENT DOCUMENTS 5,035,598  7/1991  Fujita et al. .................... 264/40.7
5,275,768  1/1994  Inaba et al. .................... 264/40.1
5,350,546  9/1994  Takeuchi et al. ................ 264/40.1
5,350,547  9/1994  Yamaguchi et al. .............. 264/40.1
5,518,671  5/1996  Takizawa et al. ................ 264/40.1
5,539,650  7/1996  Hehl ............................ 264/40.1
5,595,693  1/1997  Fujita et al. .................. 264/40.1

FOREIGN PATENT DOCUMENTS 4-209004   7/1992  Japan .
5-286006  11/1993  Japan .
6-170907   6/1994  Japan .
6-182842   7/1994  Japan .
8-156060   6/1996  Japan .

OTHER PUBLICATIONS

Japan Vinyl Goods Manufacturer's Assoc., "Plastic Molding and Computer", Tokyo, K.K. Kogyo Chosakai, Jul. 1, 1982, p. 82–100.

*Primary Examiner*—Jill L. Heitbrink
*Attorney, Agent, or Firm*—Staas & Halsey LLP

[57] ABSTRACT

A method of collecting molding data and obtaining a molding condition releases an operator from test shot operations and improves operation efficiency. A rough molding condition obtained by a condition setting operation is modified with a pitch which is set for respective molding condition items and a plurality of analogous molding conditions are created and stored in a host computer. A set of the analogous molding conditions and the set number of test shots are transferred to a controller of an injection molding machine to continuously carry out the test shots. Molding data detected in the test shots are transferred to and stored in the host computer. An optimal molding condition is obtained by evaluating the molding data under the respective molding conditions.

7 Claims, 6 Drawing Sheets

MEMORY IN INJECTION MOLDING MACHINE
(ROUGH MOLDING CONDITION BY CONDITION SETTING OPERATION)

| CONDITION | D1 | D2 | ····· | D (R3) | ····· | DN2 |
|---|---|---|---|---|---|---|
| VALUE | C1 | C2 | ····· | C (R3) | ····· | CN2 |

FIG. 8

PRELIMINARY MOLDING CONDITION FILE

| CONDITION | D1 | D2 | ····· | D (R3) | ····· | DN2 |
|---|---|---|---|---|---|---|
| VALUE | C'1 | C'2 | ····· | C' (R3) | ····· | C'N2 |
| NUMBER OF SHOTS | | | | | | |

FIG. 9

SCHEDULE CONTROL FILE

| MOLDING MACHINE \ FILE | 1 | 2 | ···· | i2 | ···· | E |
|---|---|---|---|---|---|---|
| 1 | (1, 1) | (1, 2) | ···· | (1, i2) | ···· | (1, E1) |
| 2 | (2, 1) | (2, 2) | ···· | (2, i2) | ···· | (2, E2) |
| · | · | · | · | · | · | · |
| i1 | (i1, 1) | (i1, 2) | ··· | (i1, i2) | ··· | (i1, Ei1) |
| · | · | · | · | · | · | · |
| N1 | (N1, 1) | (N1, 2) | ··· | (N1, i2) | ··· | (N1, EN1) |

FIG. 10

SAMPLING DATA WITH RESPECT TO (i1, i2)

| ITEM \ SHOT NUMBER | D1 | D2 | · | DN2 | DN2+1 | DNX |
|---|---|---|---|---|---|---|
| 1 | ─── | ─── | · | ─── | ─── | ─── |
| 2 | ─── | ─── | · | ─── | ─── | ─── |
| · | · | · | · | · | · | · |
| MAXIMUM | ─── | ─── | · | ─── | ─── | ─── |
| MINIMUM | ─── | ─── | · | ─── | ─── | ─── |
| AVERAGE | ─── | ─── | · | ─── | ─── | ─── |

METHOD OF COLLECTING MOLDING DATA AND OBTAINING MOLDING CONDITION FOR INJECTION MOLDING MACHINE

FIELD OF THE FIELD

The present invention relates to a method of collecting molding data and a method of obtaining a stable molding condition using the molding data collected by the molding data collecting method.

BACKGROUND OF THE RELATED ART

In performing an injection molding operation using a new mold mounted in an injection molding machine for the first time, it is necessary to obtain a molding condition for stably obtaining a conforming product by performing a condition setting operation to adjust various items of the molding condition, i.e. temperature of an injection cylinder, injection pressure, injection speed, injection/pressure-holding switching position, screw back position, etc. There is a molding condition item such as the screw back position with regard to measurement, in which precise setting data can be obtained by a calculation process based on the weight of a product molded in an over-packed condition, specific gravity of molding material and a diameter of an injection screw, etc. However, most of the molding conditions such as cylinder temperature, injection pressure, injection speed, injection/pressure-holding switching position are ordinarily set by an operator on the basis of his or her experiments. As a result, it is difficult to appropriately set these molding condition items except by a very skilled operator. It is also inevitable to repeat the setting operation by on a trial-and-error basis to obtain the appropriate molding conditions.

However, even if the molding condition is obtained by the complicated operation as an appropriate molding condition, a stable product is not always consistently obtained and instances in which a non-conforming product is produced may occur. Of course, there is an apparent cause such as a temperature variation in the atmosphere, but other unobvious phenomenons such as an accumulation of errors caused by inappropriate molding conditions which have not appeared in the initial state, a mold temperature not reaching a balanced state, or a viscose resistance of lubricated parts of the injection molding machine varying with time, may cause an abnormality of molding. Most of the modern injection molding machines are designed to carry out feedback controls with respect to injection pressure, injection speed and temperature of the injection cylinder, but the aforementioned unobvious phenomenons are not overcome by such a control process and an abnormality which has been suppressed by feedback control at an initial stage may suddenly appear at a stage at which the ability of the machine to adapt is exceeded. The causes of these phenomenon are not clear and raise a problem in the molding operation.

Thus, in order to obtain a molding condition for producing a stable product for a long time, it is inevitably necessary to modify the molding condition which has been obtained as appropriate in the initial stage and to repeatedly carry out a considerable number of test shots under the modified condition to obtain data to confirm stability, and to select the molding condition to be appropriate from the results. Of course, an operator is required to perform a modification operation of the molding condition in constant attendance on the injection molding machine until the test shots are completed. It is not appropriate for the operator to do such operation for a long time in view of a running cost and in many cases the molding condition is determined on compromise and it is not assured that the molding operation is carried out under the appropriate molding condition.

SUMMARY OF THE INVENTION

An object of the present invention is to provide a molding data collecting method and a molding condition obtaining method in which a modifying operation of a molding condition and a collecting operation of molding data are automatically executed to release operators from an operation of the test shot.

A molding data collecting method for an injection molding machine of the present invention comprises the steps of obtaining a rough molding condition for obtaining a molded product by performing a condition setting operation under different molding conditions each constituted by a plurality of molding condition item, automatically obtaining a plurality of molding conditions analogous with the obtained rough molding condition, and automatically performing a continuous molding operation by set times or for a set time period under each analogous molding condition to collect molding data for each molding condition.

Each of said plurality of analogous molding conditions can be automatically obtained by successively increasing/decreasing a molding condition value for each molding condition item of the rough molding condition.

Respective molding data may be collected in a host computer for managing the injection molding machines. Further, the analogous molding conditions and the set times and the set time period may be stored in the host computer and the host computer successively commands the analogous molding conditions and the set times or the set time period, to collect the respective molding data.

After collecting the molding data for each molding condition, a dispersion degree or the like of the molding data under each molding condition is evaluated to obtain an optimal molding condition.

DESCRIPTION OF THE PREFERRED EMBODIMENTS

Figure 1:
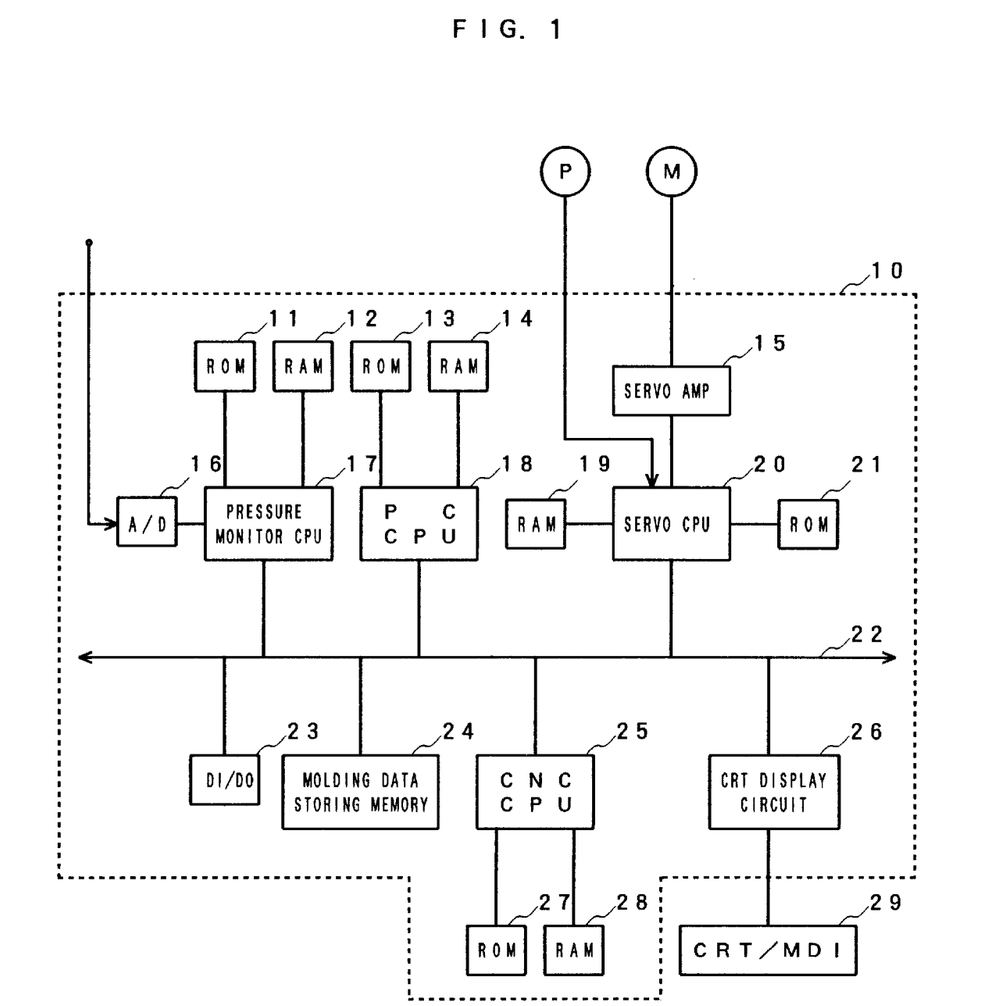
FIG. 1 is a block diagram showing a principal part of a controller of an injection molding machine for carrying out the present invention.

FIG. 1 shows a principal part of a controller 10 for drivingly controlling an injection molding machine for carrying out a molding data collecting method of the present invention. The controller 10 comprises a CPU 25 for CNC as a micro-processor for numerical control, CPU 18 for PC as a micro-processor for a programmable controller, a servo CPU 20 as a micro-processor for servo control and a pressure monitor CPU 17 for executing a sampling process by detecting an injection pressure and a screw back pressure from pressure detectors provided on an injection molding machine body through an A/D convertor. Information is transmitted among respective micro-processors by selecting mutual input/output through a bus 22.

PCCPU 18 is connected to a ROM 13 for storing a sequence program for controlling a sequential action of the injection molding machine and a RAM 14 for use in temporarily storing data of an arithmetic operation. The CNCCPU 25 is connected to a ROM 27 for storing an automatic operation program to wholly control the injection molding machine, and a RAM 28 for use in temporarily storing operation data.

The servo CPU 20 is connected to a ROM 21 for storing a control program dedicated for a servo control and a RAM 19 for temporarily storage data, and the pressure monitor CPU 17 is connected to a ROM 11 for storing a control program for a sampling process of the injection pressure and screw back pressure and with a RAM 12 for a temporarily storage of data. Further, the servo CPU 20 is connected to servo amplifiers for driving servomotors for respective axes such as clamping, injection, screw rotation, ejection, etc. and outputs from position/speed detectors attached to respective servomotors are fed back to the servo CPU 20. The current positions of the respective axes are calculated by the servo CPU 20 based on feedback pulses from the position/speed detectors and renewed and stored in current position storing resistors for the respective axes. A servo amplifier 15, a servomotor M and a position/speed detector P for one axis are shown in FIG. 1, and respective axes for clamping, injection, ejection, etc. have the same structure. With respect to the axis for screw rotation, however, the current position need not be detected and it is sufficient to detect only the speed.

An interface 23 is an input/output interface for connection to a host computer, etc.

A manual data input device 29 to display is connected with a bus 22 via a CRT display device and is capable of selecting a graphic display picture and function menu, and inputting various data, and provided with numeral keys for inputting numerical data and various functional keys.

Figure 7:
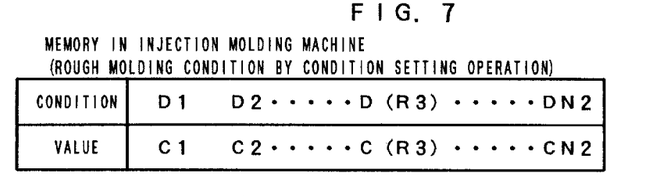
FIG. 7 is a schematic diagram showing contents of a molding condition storing memory of the controller.

A non-volatile memory 24 is a molding data storing memory for storing molding conditions regarding the injection molding operation and various set values, parameters, macro variables, etc. and provided with a molding condition storing memory for storing at least one pair of molding conditions to be used in executing the injection molding operation. As shown in FIG. 7, in this molding condition storing memory, various molding condition items D1, D2, ..., Dn2, such as temperature of the injection cylinder, injection speed, injection/pressure holding switching position, screw back position, cushion amount, back pressure etc. and the molding condition values (set values) C1, C2, ..., Cn2 thereof are stored in one-to-one relation.

The controller 10 includes a data sampling function as known from Japanese Patent Laid-Open Publication No. 6-17090, etc. With this data sampling function, molding conditions such as the temperature of the injection cylinder, the injection pressure, the injection speed, the injection/ pressure holding switching position, the screw back position, the cushion amount, the back pressure etc. and also molding cycle time, time of measuring and time of injection (these items are not set items) are detected and stored in the sampling data storing file in the non-volatile memory 24.

With the above arrangement, PCCPU 18 controls a sequential operation of the whole injection molding machine and CNCCPU 18 distributes pulses for respective servomotors based on the operation program stored in the ROM 27 and the molding condition stored in the non-volatile memory 24, and the servo CPU 20 performs servo control including a position loop control, a speed loop control and further an electric current loop control to execute digital servo processing based on the motion commands distributed as pulses for the respective axes and the feedback signals of the position and speed detected by the position/speed detector, to control the servomotors for respective axes.

Figure 3:
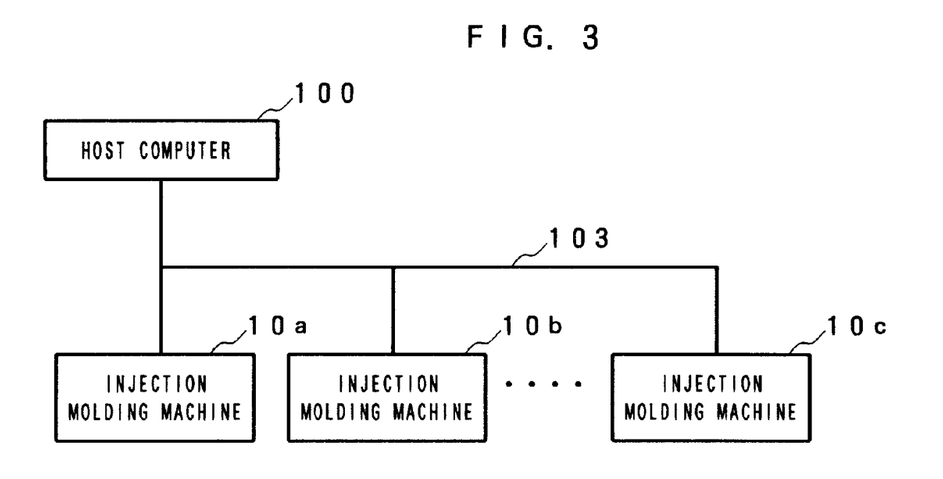
FIG. 3 is schematic view showing a connection between the host computer and the injection molding machine.

As shown in FIG. 3, in this embodiment, a plurality of injection molding machines 10a, 10b, ..., 10c (each assigned with a molding machine number), each provided with the controller 10 having the above-described arrangement are connected to one host computer 100 through a data transfer path 103 (such as LAN). The host computer 100 executes a control regarding setting of analogous molding conditions and the final storage of the molding data of the injection molding machines 10a, 10b, ..., 10c.

Figure 2:
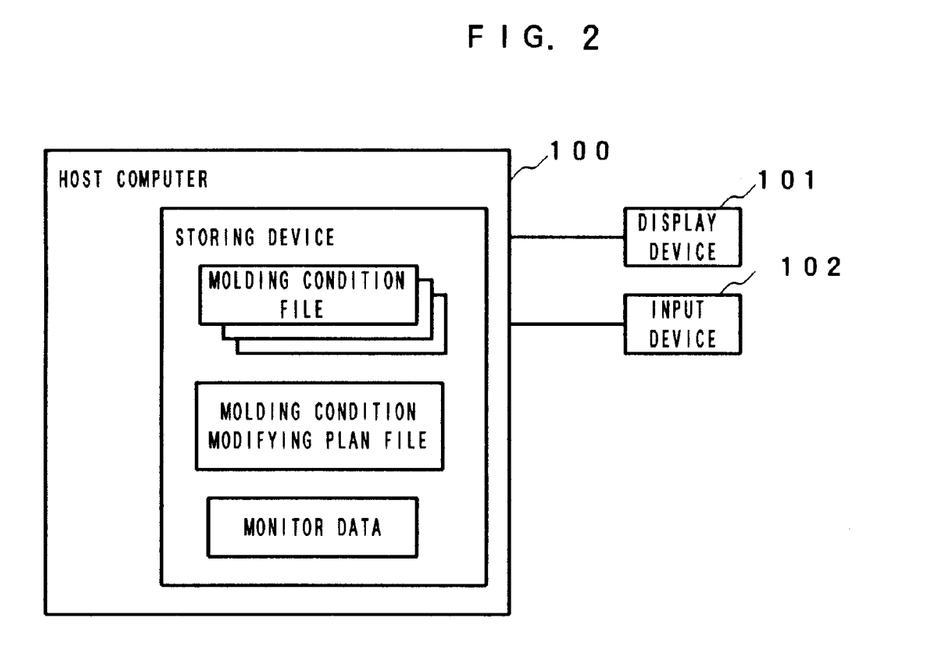
FIG. 2 is a schematic view showing an architecture of a host computer for managing the injection molding machines.

As shown in the schematic view of FIG. 2, the host computer 100 comprises by an ordinary personal computer or mini-computer provided with an input device 102 having a keyboard and a mouse, and a display device 101. The storing device includes a plurality of molding condition files for respectively storing the above-described analogous molding conditions, molding condition modifying plan files for making the injection molding machine 10a, 10b, ..., 10c carry out test shots based on the respective molding conditions contained in the molding condition files, and monitor data storing files for saving molding data collected from the injection molding machines 10a, 10b, ..., 10c in corresponding relation. As the storing device, it is preferable to use a hard disk having large capacity capable of storing a large amount of data.

Figure 4:
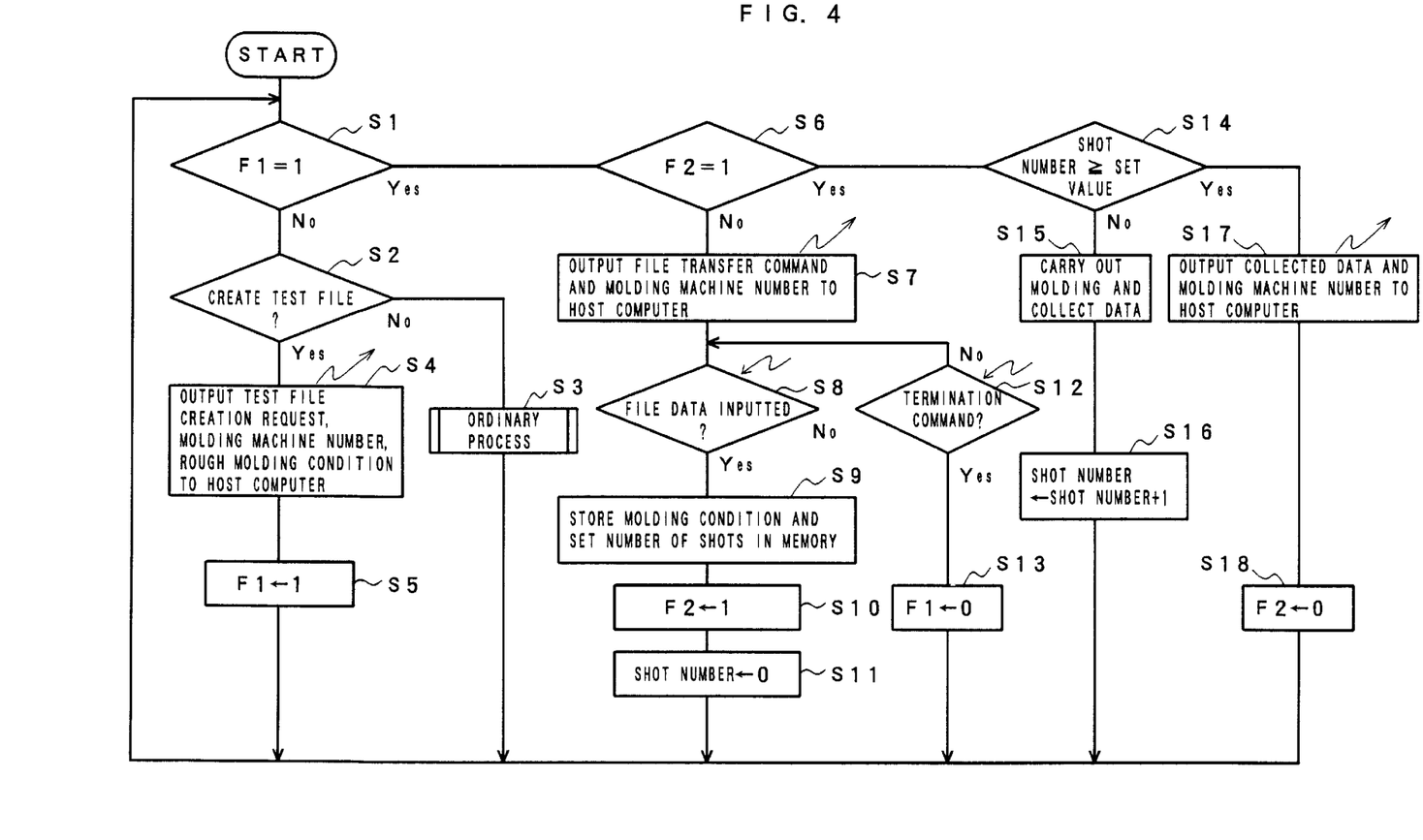
FIG. 4 is a flowchart showing an outline of processing to be executed by the controller of the injection molding machine in collecting molding data.
Figure 5:
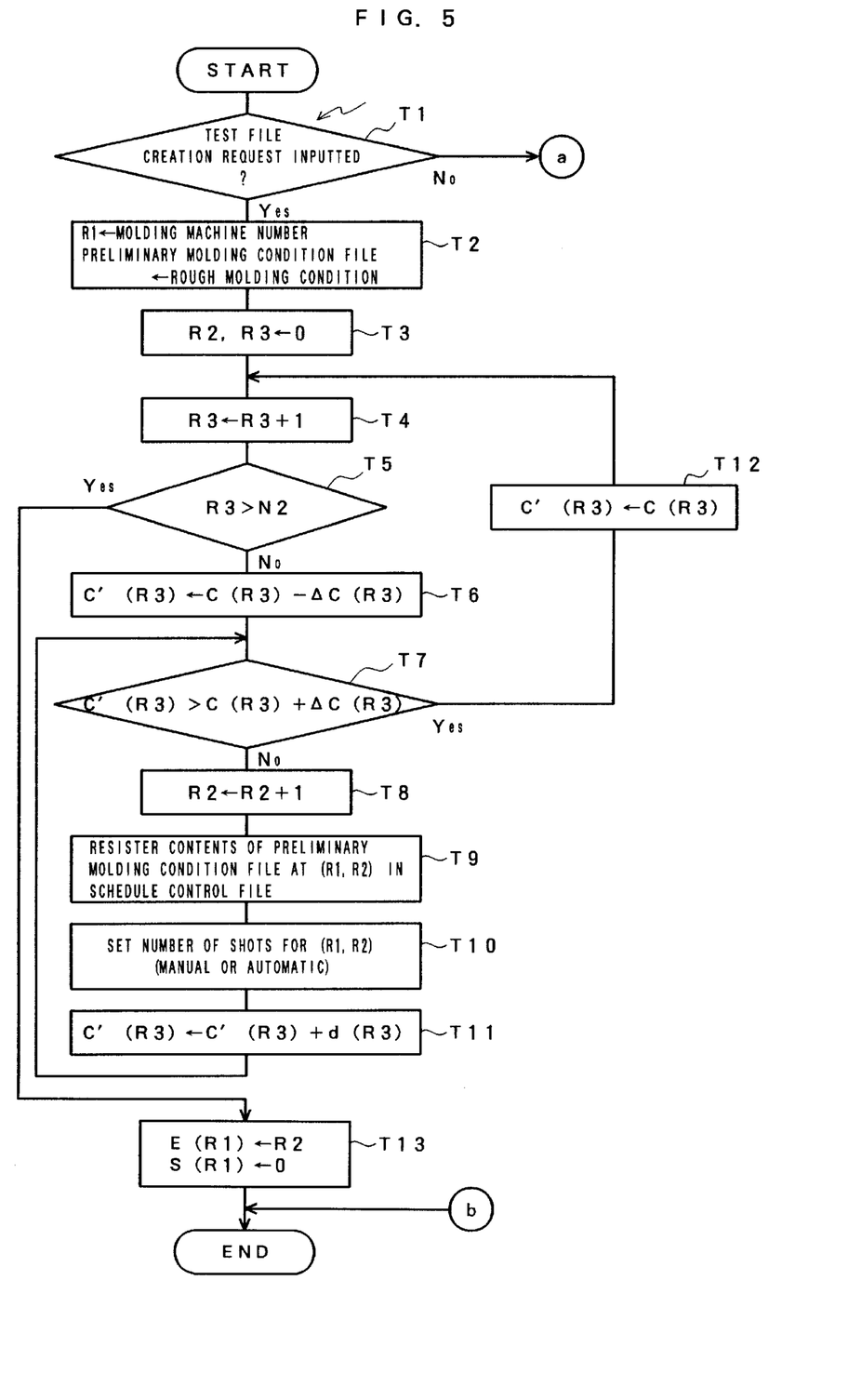
FIG. 5 is a flowchart showing an outline of processing to be executed by the host computer in collecting molding data.
Figure 6:
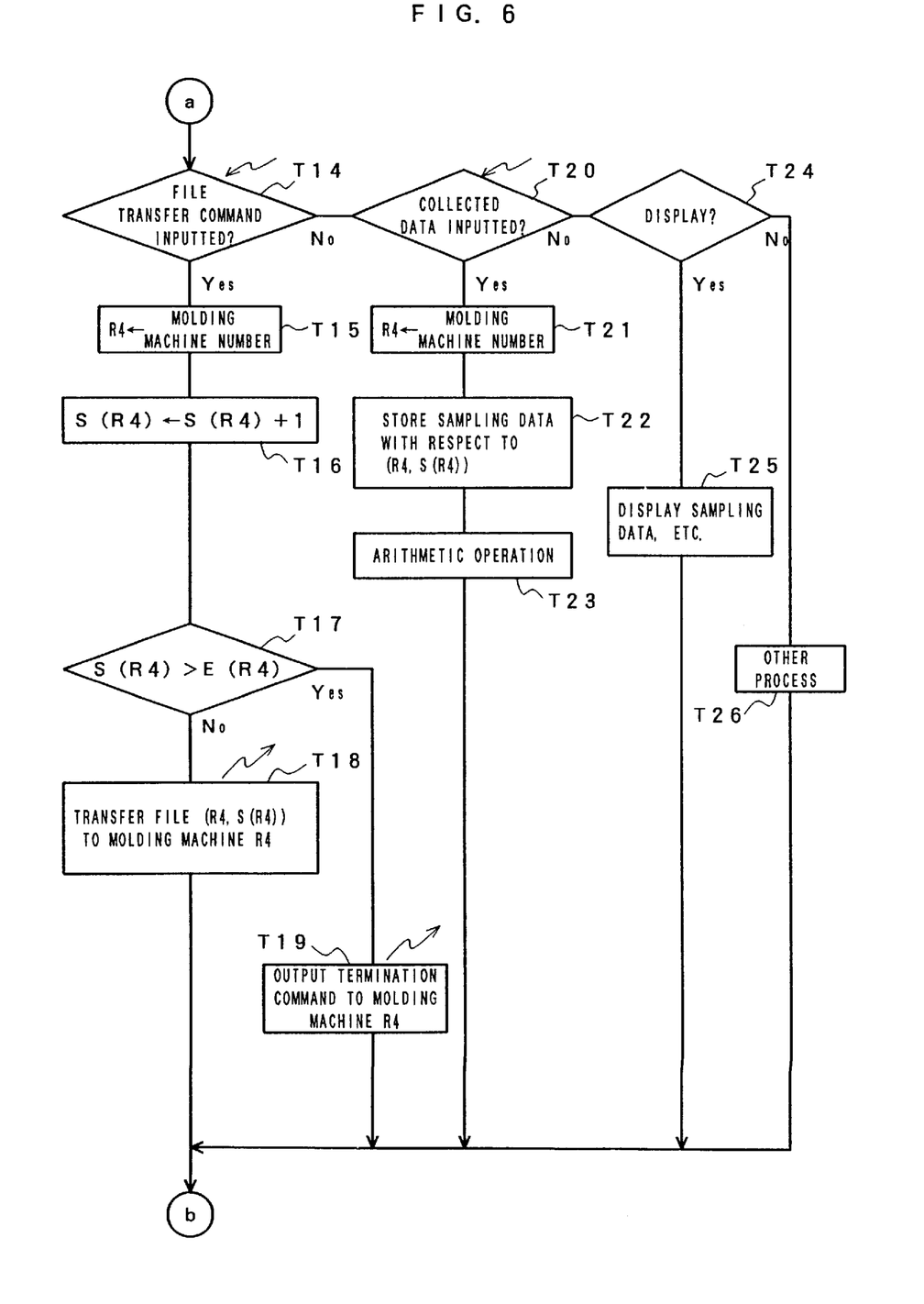
FIG. 6 is a continuation of the flowchart of FIG. 5.

FIG. 4 is a flowchart showing an outline of processing to be executed by the controller 10 in the injection molding machines 10a, 10b, ..., 10c in carrying out the test shots. FIGS. 5 and 6 are flowcharts showing an outline of processing to be executed by the host computer 100.

An operator mounts a new mold on an injection molding machine and performs a condition setting operation on trial-and-error basis under a plurality of different molding conditions, to find a molding condition in which a normal product is obtained (this condition is hereinafter referred to as a rough molding condition). In the present invention, as a continuous injection molding operation is not carried out under the rough molding condition for a long time, it is not necessary to carry out the condition setting operation prudently. The rough molding condition means a molding condition under which normal products can be obtained continuously for a considerable time.

A modification and re-setting of the molding condition in the condition setting process and control of the injection molding machine is carried out in Step S3 in a state in which a flag F1 is an initial value 0 and a test file creation demand key is not operated. As the condition setting operation is well known in the art, detailed description thereof is omitted here.

After the condition setting operation is completed to obtain the rough molding condition, the operator operates the test-file-creation demand key, the controller 10 of the injection molding machine detects the key operation by the operator in a discrimination process of Step S2 and transfers a test file creation request command, the molding machine number and the above-described rough molding condition, i.e. setting contents C1, C2, ..., Cn2 (FIG. 7) of the various molding condition items stored in the molding condition storing memory to the host computer 100 (Step S4), and sets the flag F1 which indicates an execution of the test shot (Step S5).

On the other hand, the host computer 100 repeatedly executes at every predetermined cycle, discrimination processing of Steps T1, T14, T20 and T24 in which discrimination results are always NO, and a background processing of Stap T24 (not relevant to the present invention). When the test-file-creation request command from the controller 10 of any injection molding machine is detected in the discrimination processing of Step T1, several molding conditions analogous with the rough molding condition (FIG. 7) based on the molding machine number of the injection molding machine and the rough molding condition and starts a process for setting them in a schedule control file.

Figure 8:
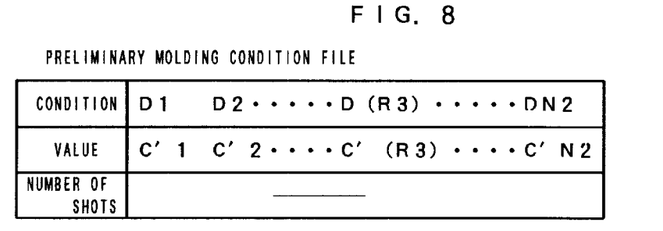
FIG. 8 is a schematic diagram showing a preliminary molding condition file in the host computer.

When the host computer 100 detects the test file creation request command form the controller of any one of the injection molding machines 10a, 10b, ..., 10c, the host computer 100 temporarily stores the molding machine number and the molding condition values C1, C2, ..., Cn2 of the molding condition items of the rough molding condition, which are transferred from the controller, in the RAM of the computer. Then the host computer 100 stores the molding condition values C1, C2, ..., Cn2 in a preliminary molding condition file (FIG. 8) of the RAM of the host computer 100 as preliminary condition file values C'1, C'2, ..., C'n2 (Step T2).

Then, the host computer 100 initializes values of a counter R2 for integrating and storing the total number of the analogous molding conditions created for the injection molding machine which outputs the test-file creation request command, and a counter R3 for integrating and storing the numbers of the molding condition items created by changing the molding condition values for the injection molding machine (Step T3). Subsequently, the host computer 100 increments the value of the counter R3 by 1 (Step T4) and discriminates whether or the number of the counter, i.e. the number of the molding condition items created by changing the molding condition values, reaches the number N2 of the all the molding condition items (Step T5).

If the value of the counter R3 does not reach the number N2 of all the molding condition items, it is necessary to create further analogous molding conditions by setting the molding condition values analogous with the molding condition items which are not processed at the present stage. The host computer 100 subtracts the rough molding condition value C(R3) of the molding condition item D(R3) corresponding to the value in the counter R3 from an allowable tolerance region AC(R3) which is predetermined for the molding condition item D(R3), and the minimum value C(R3)−ΔC(R3) of the analogous molding condition value which can be regarded as an appropriate value on the basis of the rough molding condition C(R3), and updates and stores this value in place of the preliminary molding condition value C'(R3).

The host computer 100 adds the rough molding condition value C(R3) of the molding condition item D(R3) corresponding to the value in the counter R3 to the allowable region ΔC(R3) which is predetermined for the molding condition item D(R3), to obtain the maximum value C(R3)+ΔC(R3) of the analogous molding condition value which can be regarded as an appropriate value on the basis of the rough molding condition C(R3) and discriminates whether or not the current value of the preliminary molding condition value C' exceeds the maximum value C(R3)+ΔC(R3) (Step T7).

If the current value of the preliminary molding condition value C'(R3) does not exceed the maximum value C(R3)+ΔC(R3), it is clear that the current value of the preliminary molding condition value C'(R3) is between the minimum value C(R3)−ΔC(R3) and the maximum value C(R3)+ΔC(R3). As the preliminary molding condition value C'(R3) is analogous with the basic rough molding condition value C(R3), the host computer 100 increments the value of the counter R2 by 1 and updates the total number of the analogous molding conditions (Step T8) and stores the respective values of the contents C'1, C'2, ..., C'n2 of the preliminary molding condition file in a spot (R1, R2) of the schedule control file as shown in FIG. 9 as an analogous condition of the rough molding conditions C1, C2, ..., Cn2.

In summary, the analogous molding condition C'1, C'2, ..., C'n2 is (R2)th analogous molding condition set with respect to the rough molding condition C1, C2, ..., Cn2 for the injection molding machine of number R1, and only the molding condition value C'(R3) for the molding condition item D(R3) is different from the rough molding condition.

Figure 9:
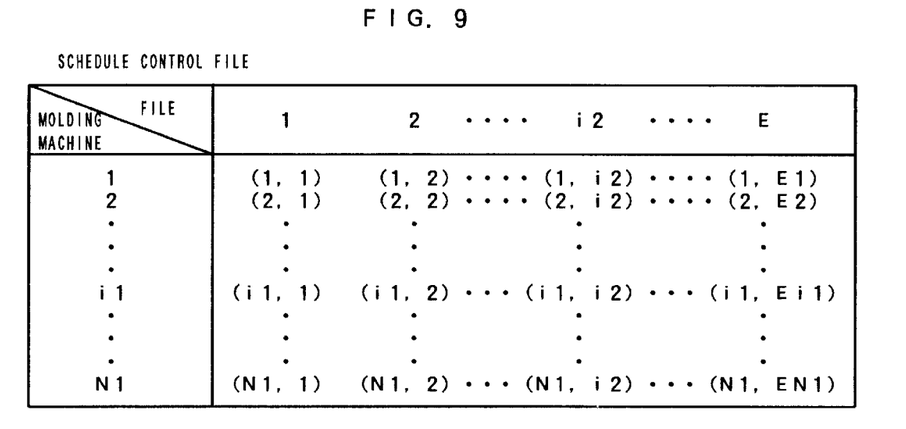
FIG. 9 is a schematic diagram showing a schedule control file in the host computer.

Subsequently, the host computer 100 makes the display device 101 display a guidance message to urge the operator's attention and wait for a manual input of the number of test shots for carrying out continuous molding operation under the analogous molding condition of the spot (R1, R2), or (automatically) adopts an initially set value (preference value) to determine the number of the test shots, and stores the determined value at the spot (R1, R2) in the schedule control file as shown in FIG. 9 in response to the preliminary molding condition file.

The reason why the numbers of test shots is set by the manual input by the operator or by the initially set value for each molding condition item D(R3) to be modified is that the time (or the number of the shots) necessary for converging the molding data is different for each molding condition item. The schedule control file in this embodiment serves as the molding condition file and also the molding condition modifying plan file in FIG. 2.

Subsequently, the host computer 100 adds a pitch value d(R3) which is predetermined for the molding condition item D(R3) to the current value of the preliminary condition value C'(R3) of the molding condition item D(R3) corresponding to the value of the counter R3, to obtain a new analogous molding condition value C'(R3) (Step T11) and then proceeds to Step T7 to repeatedly execute the same processing as above.

As a result, a plurality of analogous molding conditions are created in a range from the minimum value C(R3)−ΔC(R3) to the maximum value C(R3)+ΔC(R3), which are regarded as appropriate values on the basis of the rough molding condition value C(R3) with the pitch d, and each of the analogous molding conditions is successively registered at a row R1 of the schedule control file for to the injection molding machine (of the molding machine number R1), which is an object of the creation of the analogous molding condition.

An order of registration of the analogous molding conditions (=an order of the execution of the test shots by the injection molding machine) may be determined so that the value of the analogous molding condition value C' is changed from C(R3) to C(R3)−ΔC(R3) and then from C(R3) to C(R3)+ΔC(R3), or from C(R3) to C(R3)+ΔC(R3) and then from C(R3) to C(R3)−ΔC(R3). In this order, however, there is caused a difference greater than the pitch d in switching from C(R3)−ΔC(R3) to C(R3) and from C(R3)+ΔC(R3) to C(R3), to cause a problem, in particular, of taking a long time for converging the molding data in changing the temperature of the injection molding machine. Therefore, it is preferable that the analogous molding condition value C'(R3) is continuously increased (in the case of d(R3)>0) or continuously decreased (in the case of d(R3)<0) by the pitch d(R3) in view of the time required and consuming amount of resin, as in this embodiment.

In the above way, while the analogous molding conditions in which only the molding condition value C'(R3) of the molding condition item D(R3) is modified is successively registered in the schedule control file by the repeated processing of Steps T7–T11, when it is discriminated that the current value of the preliminary molding condition value C'(R3) exceeds the maximum value C(R3)+ΔC(R3) in the discrimination processing of Step T7, the host computer 100 restores the value of the preliminary molding condition value C'(R3) to the value of the basic rough molding condition C(R3) to restore the contents of the preliminary molding condition file to the original rough molding condition values C1, C2, . . . , Cn2 (Step T12), and proceeds to Step T4 again to increment the value of the counter R3 by 1, and discriminates whether or not the value of the counter R3 reaches the number N2 of all the molding condition items (Step T5).

If the value of the counter R3 does not reach the number N2 of all the molding condition items, the host computer 100 executes the processing of Step T6 and the repeated processing of Steps T7–T11 in the same manner as mentioned above based on the updated value of the counter R3. Thus, a plurality of analogous molding conditions are created by modifying the molding condition value C'(R3) of the next molding condition item D(R3) by the pitch d(R3) from the minimum value C(R3)−ΔC(R3) to the maximum value C(R3)+ΔC(R3) and the analogous molding conditions are registered in order at the row R1 of the schedule control file for the injection molding machine (of the molding machine number R1) for which the analogous molding conditions are created.

The above processing is repeatedly executed until the value of the counter R3 reaches the number N2 of all the molding condition items, and thereby a plurality of analogous molding conditions in which only the molding condition value C'1 of the molding condition item D1 is modified by the pitch d1, a plurality of analogous molding conditions in which only the molding condition value C'2 of the molding condition item D2 is modified by the pitch d2, . . . , a plurality of analogous molding conditions in which only the molding condition value C'n2 of the molding condition item Dn2 is modified by the pitch dn2 are stored at the row R1 of the schedule control file.

When it is discriminated that the value of the counter R3 reaches the number N2 of all the molding condition items in Step T5, the host computer 100 stores the current value (final value) of the resister R2 in the file-number-storage resister E(R1) as the total number of the analogous molding conditions for the injection molding machine of the molding machine number R1, and initializes the value of the index S(R1) which indicates an address of the analogous molding conditions to be transferred to the injection molding machine (Step T13).

As the above processing is executed each time when the test-file-creation command from the controller 10 of any injection machine is detected, the analogous molding conditions for plural injection machines may be stored in parallel in the schedule control file as shown in FIG. 9. However, since rows of the schedule control file for storing the analogous molding conditions are identified by the molding machine numbers, the one-to-one relation between the injection molding machine and the analogous molding conditions therefor are retained. Further, as the values of the file-number-storage resister E(R1) and the index S(R1) are set for the molding machine number of the injection molding machine, confusion never occurs in transferring the files.

The controller 10, which has transferred the file creation request command and the rough molding condition to the host computer 100 and set the flag F1 in Step S5, proceeds to processing of Step S6 through the discrimination processing of Step S1 and discriminates whether or not the flag F2 is set. This flag F2 is set each time when a test shot under the new analogous molding condition is started and reset each time when the test shot under the new analogous molding condition is terminated, and the initial value of the flag is 0. At this stage, as the flag F2 is retained to be the initial value 0, the discrimination result in Step S6 is NO and thus the controller 10 outputs a file-transfer command and the molding machine number of the injection molding machine (Step S7) and waits for the transmission of the analogous molding condition file from the host computer 100 or an input of the test shot termination command (Step S8, Step S12).

On the other hand, the host computer 100 detects the file transfer command from the controller 10 in the processing of Step 14 and stores the transferred molding machine number in the resister R4 (Step T15). Then, the host computer 100 increments the value of the index S(R4) indicating the injection molding machine of the molding machine number R4 by 1 (Step T16) and discriminates whether or not the current value of the index S(R4) reaches the value of the file-number storage resistor E(R4) which stores the total number of the analogous molding conditions for the injection molding machine of the molding machine number R4 (Step T17).

If the current value of S(R4) does not reach E(R4), it means that the analogous molding condition under which the test shot should be carried out by the injection molding machine of the molding machine number R4 remains in the schedule control file. Therefore, the host computer 100 reads the analogous molding condition and the set value of the number of the test shots for the analogous molding condition at a spot (R4, S(R4)) in the schedule control file based on the value of the molding machine number R4 and the current value of the index S(R4) of the analogous molding condition for the molding machine number R4, and transfers these values to the injection molding machine of the molding machine number R4 (Step T18).

If the current value of the index S(R4) reaches the total number E(R4) of the analogous molding conditions, it means that all the test shots under the analogous molding conditions for the injection molding machine of the molding machine number R4 have been completed. The host computer 100, therefore, outputs a test shot terminating command to the injection molding machine of the molding number R4 (Step T19).

These signals are detected by the controller 10 in Step S8 or Step S12.

When the controller 10 receives data of the analogous molding conditions from the host computer 100 (i.e. the test shot terminating command is not inputted), the controller 10 stores the molding condition values of the analogous molding conditions and the number of the test shots in the molding condition storage memory of the non-volatile memory 24 as data for execution (Step S9) and set the flag 2 to memorize a start of the test shots under new analogous molding conditions (Step S10). The controller initializes a shot number counter for counting the number of the test shots under the analogous molding conditions to zero (Step S11).

The controller 10 repeatedly executes the discrimination processing of Steps S1, S6 and S14, the injection molding operation of one cycle, the collection of molding data by the data sampling function in the conventional manner (Step S15), and the counting by the shot number counter (Step S16), to store molding data of the set shot number in the sampling data storage file in the non-volatile memory 24 every time when the injection molding operation of one cycle is carried out. In the case where the time period for carrying out the molding operation is set in Step T10, an timer is set to start counting time in Step S9 and the counted time are compared with the set time period in Step S14.

When it is discriminated that the value of the shot number counter reaches the set shot number in the discrimination processing of Step S14, the controller 10 transfers the molding data of the number of the set shots, which are stored in the sampling data storage file of the nonvolatile memory 24, and the molding machine number of the injection molding machine to the host computer 100 (Step S17), and then reset the flag F2 (Step S18). The number of the molding data to be stored in the sampling data storage file of the non-volatile memory 24 corresponds to the set number of shots for one set of analogous molding conditions and therefore is several tens.

Figure 10:
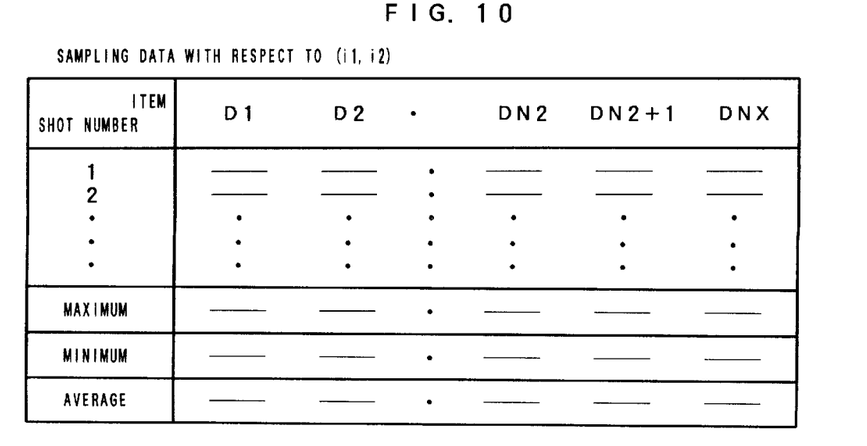
FIG. 10 is a schematic diagram showing a sampling data storage file in the host computer.

The host computer 100 detects an input of the collected data from the controller 10 in the processing of Step T20 and the transferred molding machine number in the resistor R4 (Step T21) and specify a spot (R4, S(R4)) of the analogous molding condition for the injection molding machine of the molding machine number R4 in the schedule control file, and stores contents of the molding data in a molding data storage memory of a hard disk. etc. (Step T22). An example of the molding data storage memory for storing the contents of the molding data is shown in FIG. 10. The molding data storage memory includes the detected values of items D1, D2, . . . , Dn2 of temperature of injection cylinder, injection pressure, injection speed, injection/pressure-holding switching position, screw back position, cushion amount, back pressure, etc. which can be set by an operator and information of items of Dn2+1, . . . , Dnx of molding cycle time, time period for measuring, time period for injection, etc. which are detected as a result. In the respective spots of the schedule control file, there are stored indices showing storage addresses of the analogous molding conditions and the molding data associated therewith, and the analogous molding conditions and a large number of molding data are not actually written.

Further, at a stage where test shots for one set of analogous molding conditions are completed and the molding data thereof are received, a customize process for calculating minimum, maximum and average values and other statistical values of the molding data for each item can be executed, and these values are stored n the molding data storage memory together with the molding data on which the calculations are based (Step T23).

On the other hand, the controller 10 which has reset the flag F2 in the processing of Step S18 proceeds to the processing of Step S7 again through the discrimination processing of Steps S1 and S6 and outputs the file transfer command and the molding machine number to the host computer 10, to wait for an data input of a new test shot file (Step S8, Step S12).

The above processing is repeatedly executed in the same manner by the host computer 100 and the controller 10 until the current value of the index S(R4), indicating the injection molding machine R4 which has output the file transfer command, reaches the total number E(R4) of the analogous molding conditions for the injection molding machine R4 (Step T17), and thereby test shots under all the analogous molding conditions of E(R4) set for the injection molding machine of the molding number R4 are carried out by the injection molding machine R4 by the set number for each analogous molding condition. Thus, the molding data for all the analogous molding conditions which are created by modifying the molding condition values of the molding condition items D1, D2, . . . , Dn2 one by one are successively stored by the respective number of the test shots in the molding condition storage memory of the host computer 100.

The analogous molding conditions includes a set of analogous molding conditions in which only the molding condition value of the molding condition item D1 of the items D1, D2, . . . , Dn2 is modified by the pitch d1 from C1−ΔC1 to C1+ΔC1, a set of analogous molding conditions in which only the molding condition value of the molding condition item D2 is modified by the pitch d2 from C2−ΔC2 to C2+ΔC2, . . . , a set of analogous molding conditions in which only the molding condition value of the molding condition item Dn2 is modified by the pitch dN2 from Cn2−ΔCn2 to Cn2+ΔCn2.

When it is discriminated that the current value of the index S(R4) reaches the total number E(R4) of the analogous molding conditions for the injection molding machine of the molding machine number R4 in Step T17 of the processing by the host computer 100, the host computer 100 outputs a termination command to the injection molding machine of the molding machine number R4 (Step T19), the controller 10 detects the termination command in Step 12 and resets the flag F1 in Step 13 not to enter the processing of Step S15 and terminate the test shots by the injection molding machine. As already mentioned, the value of R4 in the index S(R4) is set respectively for the molding machine number of the injection molding machine, and therefore even if the test shots are carried out by the plural injection molding machines simultaneously, no confusion occurs in transferring the test file or input/output of the termination command, as the row of the schedule control file corresponds to the injection molding machine in one-to-one relation.

A supervisor of the host computer or an operator of each injection molding machine specifies a molding machine number and a molding condition item which may effect a stability of the molding operation, and demands to display the data of effects of the molding condition item on the molded products by the injection molding machine (and the mold on the injection molding machine) on the display device 101 (Step T24). For example, if the supervisor or the operator wants to know a variation of stability of the molding data when the molding condition vale C'y of the molding condition item Dy is modified, he or she inputs (x, Dy).

The host computer 100 searches data on a row x of the schedule control file in response to the input operation and reads the molding data when the molding condition value of the molding condition item Dy is modified, i.e., the molding data each associated with the molding condition vale C'y ranging from Cy−ΔCy to Cy+ΔCy for the molding condition item Dy (Cy is the initial rough molding condition data of the molding condition item Dy), and then displays the molding data of the set number of the test shots for each value of C'y (molding condition value varied with a pitch dy) as shown in FIG. 10 (see Step T25).

In the example of FIG. 10, the molding data with respect to one molding condition C'y (for example, C'y=Cy−ΔCy) in the plural molding condition values C'y ranging from Cy−ΔCy to Cy+ΔCy are displayed (the number of the shots is corresponding to the set number in Step T10). By incrementing an address index (indicating a column of the file in FIG. 9) which corresponds to the index R2 one by one to display the data in the same manner, the molding data with respect to all the analogous molding condition values C'y ranging from Cy−ΔCy to Cy+ΔCy (i.e. analogous molding conditions in which only the molding condition value C'y of the molding condition item Dy is modified by the pitch dy with the other molding condition values remained as the rough molding condition values) can be read and displayed, and therefore a value of C'y having a smallest range between maximum and minimum values can be selected as the optimal value, for example.

Subsequently, the similar procedure is carried out by incrementing the value of y by 1 to obtain the optimal value C'y of the molding condition value for the molding condition item Dy having the value of y from 1 to N2. The analogous molding condition comprising a value of C'y for a molding condition item, which has a smallest range between maximum and minimum values can be adopted as the optimal molding condition (in this case the molding condition values except the molding condition value C'y for the molding condition item Dy are identical with the rough molding condition values), or the a combination of the molding condition values C'y for respective molding condition items, each having a smallest range between maximum and minimum values can be used as the optimal molding condition (in this case the optimal molding condition value C'y for each item from Dy=D1 to Dy=D$_n$2 is obtained and these values C'y from y=1 to y=$_n$2 are combined to create the optimal molding condition. Thus, in general, each value for each molding condition item of the optimal molding condition is different from that in the rough molding condition.)

The above procedures can be achieved by the four fundamental rules of arithmetic operation (procedure of obtaining the range between the maximum and minimum values), comparison of the larger and the smaller (comparison of ranges between the maximum and minimum values) and reference to the data file (selection of the molding condition having the smallest range between the maximum and minimum values or creation of the optimal molding condition by a combination of the molding conditions each having the smallest range between the maximum and minimum values). Thus, all the process can be automatically carried out by the injection molding machine or the host computer including the collection of the molding data and the obtaining of the optimal molding condition by preparing an appropriate program.

Further, in a case where it is troublesome to display the molding data for each analogous molding condition value as shown in FIG. 10 to evaluate the molding condition, one molding condition item Dy is selected and a graph with a vertical axis indicating respective molding condition values C'y which vary for the molding condition item Dy, and a horizontal axis indicating the values of a standard deviation of the molding data obtained as a substitution for a mean value or maximum and minimum values is prepared for displaying these values for each molding condition C'y, and the optimal molding condition C'y may be obtained for each molding condition item Dy from the graph.

The host computer may be used as a server for data storage and the controller 10 of the injection molding machine makes an access on the host computer 100 to take out the necessary information and makes a display of the information on the manual data input device 29 with a display device for confirmation by the operator of the injection molding machine.

In the above embodiment, the molding data of each shot are stored in the controller 10 of the injection molding machine until the value of the shot number counter reaches the set shot number and the molding data in the controller 10 are transferred to the host computer 100 when the value of the shot number counter reaches the set shot number since there is a limitation on a capacity of the memory in the controller 10. If the memory in the controller 10 has a sufficient capacity, all the molding data can be stored in the controller 10. In this case the host computer 100 is not always necessary, and a control of the schedule and an arithmetic operation may be executed by the respective controller 10.

Further, the molding data can be collected by storing the plural analogous molding conditions in the injection molding machine and modifying the analogous molding conditions based on an indication of the molding condition number from the host computer.

As long as there is no limitation on the capacity of the memory, processing for achieving the aforementioned functions can be carried out solely by the host computer or solely by the injection molding machine, or divided by them.

According to the present invention, an operator is not required to wait for completion of a test shot for each analogous molding condition and to stay around the injection molding machine for a re-setting operation of the analogous molding condition, so that the operator can do other work. Therefore, it is not necessary to shorten the time for the test shots in view of a lowering of the operation efficiency of the operator and the collection operation of the molding data can be carried out for a sufficient time to obtain a stable molding condition. By evaluating the collected data to obtain the optimal molding condition, a stabler molding operation can be achieved.

We claim:

1. A molding condition obtaining method for an injection molding machine comprising the steps of:

(a) obtaining a rough molding condition for obtaining a molded product by performing a condition setting operation under different molding conditions each constituted by a plurality of molding condition items;

(b) automatically obtaining a plurality of molding conditions analogous with the rough molding condition obtained in said step (a);

(c) automatically performing a continuous molding operation by set times or for a set time period under each analogous molding condition obtained in said step (b) to collect molding data for each molding condition; and (d) evaluating the molding data for each molding condition collected in said step (c) to obtain a stable molding condition, including obtaining an optimal molding condition by evaluating a dispersion degree of the molding data under each molding condition.

2. A molding condition obtaining method according to claim 1, said step (b) including a step of obtaining said plurality of analogous molding conditions by successively increasing/decreasing a molding condition value for each molding condition item of the rough molding condition obtained in said step (a).

3. A molding condition obtaining method according to claim 1, said step (d) including a step of selecting a molding condition under which the molding data has the smallest dispersion as an optimal molding condition.

4. A molding condition obtaining method according to claim 3, said step (b) including a step of obtaining said plurality of analogous molding conditions by successively increasing/decreasing a molding condition value for each molding condition item of the rough molding condition obtained in said step (a).

5. A molding condition obtaining method according to claim 1, said step (c) including a step of collecting respective molding data in a host computer for managing the injection molding machine.

6. A molding condition obtaining method according to claim 1, further including a step of storing said plurality of analogous molding conditions and set times and a set time period in a host computer for managing the injection molding machine, said step (c) including a step of successively commanding said analogous molding conditions and the set times or the set time period from said host computer.

7. A molding condition obtaining method according to claim 6, said step (c) including a step of collecting respective molding data in a host computer for controlling the injection molding machine.

* * * * *